United States Patent [19]
Walker et al.

[11] Patent Number: 6,144,948
[45] Date of Patent: Nov. 7, 2000

[54] INSTANT CREDIT CARD MARKETING SYSTEM FOR RESERVATIONS FOR FUTURE SERVICES

[75] Inventors: Jay S. Walker, Ridgefield; James A. Jorasch, Stamford, both of Conn.

[73] Assignee: Walker Digital, LLC, Stamford, Conn.

[21] Appl. No.: 08/880,404

[22] Filed: Jun. 23, 1997

[51] Int. Cl.[7] .................................................. G06F 17/60
[52] U.S. Cl. ............................................. 705/38; 705/10
[58] Field of Search ................................. 705/38, 10, 28; 235/379; 382/100; 709/200, 201, 202, 203, 217, 218, 219, 227, 228, 229; 707/1, 3, 4, 5, 6, 10

[56] References Cited

U.S. PATENT DOCUMENTS

| | | |
|---|---|---|
| 3,812,238 | 5/1974 | Tramposch . |
| 5,025,138 | 6/1991 | Cuervo . |
| 5,025,372 | 6/1991 | Burton et al. . |
| 5,231,570 | 7/1993 | Lee ............................................. 705/38 |
| 5,239,462 | 8/1993 | Jones et al. ................................ 705/38 |
| 5,274,547 | 12/1993 | Zoffel et al. ............................... 705/38 |
| 5,569,897 | 10/1996 | Masuda .................................... 235/379 |
| 5,583,760 | 12/1996 | Klesse ....................................... 705/38 |
| 5,611,052 | 3/1997 | Dykstra et al. ............................ 705/38 |
| 5,621,812 | 4/1997 | Deaton et al. ........................... 382/100 |

OTHER PUBLICATIONS

Murphy, Patricia, "Boscov's converts checkwriters to cardholders", ISSN 0039–1867, vol. 78, No. 6, pp. 62–63, Jun. 1996.

Anonymous, "Point of sale credit", Funds Transfer report, pp. 7–8, Apr. 1996.

Sraeel, Holly, "Approving Applicants . . . on–site", Bank Systems and Technology, vol. 31, No. 5, p. 26, May 1994.

Anonymous, "Premier Aims for 1–Minute Lending: Appr Software Expected to Speed Approval Process", American Banker, vol. 157, No. 163, p. 3, Aug. 24, 1992.

Uffman, Ken E., "A New Plateau in Credit Risk Evaluation and Customer Service", Credit World, vol. 81, No. 2, pp. 9–11, Dec. 1992.

Selwitz, R., Point–of–Sale: Euro Disneyland to Provide Speedy, Cash–Free Environment Through Hotel/Theme–Park Link (Hotel & Motel Management Jul. 29, 1991, p. 35, Dialog File 16, Document 03268475, Jul. 29, 1991.

New solution from Source Technologies features Datacard Instant Card Issuance System (Business Wire Dec. 3, 1996, Dialog File 621, Document 00704263).

Robins, G., Marui's Instant Cards (Stores vol. 74, No. 9, pp. 26–32, Dialog File 15, Document 00634870), Sep. 1992.

Meece, M., Exxon, GE Unit to Launch Cobranded Master-Card (American Banker vol. 159, No. 180, p. 17, Dialog File 148, Document 07528109, Sep. 19, 1994.

(List continued on next page.)

*Primary Examiner*—Emanuel Todd Voeltz
*Assistant Examiner*—Alexander Kalinowski
*Attorney, Agent, or Firm*—Dean Alderucci

[57] ABSTRACT

A system and method uses customer information collected by a sponsoring organization, such as a hotel, to request and pre-approve a line of credit for a customer with an issuing bank prior to the anticipated arrival of the customer at the facilities of the sponsoring organization. In one embodiment, the anticipated arrival of a potential customer is identified when the customer makes a reservation for future services or registers for attendance at a future event. Preferably, the credit card is instantly issued to the customer and activated by the sponsoring organization on behalf of the customer as part of a chargeable event while the customer is at the facilities of the sponsoring organization. The sponsoring organization may opt to offer the issuing bank a guarantee of coverage over the line of credit extended by the issuing bank. Also, customers may choose the incentive benefits they wish to receive from using the line of credit.

44 Claims, 10 Drawing Sheets

OTHER PUBLICATIONS

Petroleum Refiners are Increasing Efforts to Raise Their Share of the Shrinking Gasoline Market (Oil & Gas Journal Jan. 31, 1983, pp. 48 and 49, Dialog File 16, Document 00867316).

"Metamorphosis; Enter the Outsiders", The Economist, Mar. 25, 1989, Business, Finance and Science Section International Banking at p. 24.

Murray Raphel, "Casinos Gamble on Direct Mail; Atlantic City Casinos; Retail; Industry Overview", Direct Marketing Magazine, Feb., 1992, vol. 54; No. 10; at p. 10; ISSN: 0012-3188.

Valerie Block, "Norwest Unit Adds New Twists to Cobranding; Combination Card Plan Seen As Alternative to Private Labels", The American Banker, Jun. 15, 1994 at p. 12.

"Credit-Card Drive", South China Morning Post, Feb. 21, 1995 at p. 3.

Richard Mitchell, "Glitter Gulch Places a Bet on Debit Cards", Credit Card Management, Mar. 1996, vol. 8, No. 12 at p. 18-22; ISSN:0896-9329.

Patricia A. Murphy, "Boscov's Converts Checkwriters to Cardholders", Jun. 1996, vol. 78, No. 6 at p. 62-63; ISSN: 0039-1867.

John Curran, "Casinos Taking Credit Cards: ATMs Now Allowed on Atlantic City Tables", The Charleston Gazette, Aug. 24, 1996 at p. P3A.

Betsy Wade, "Travel Advisory; New Jersey Gamblers Get Cash on the Table", The New York Times, Sep. 15, 1996, Sunday, Late Edition—Final, Section 5; at p. 3.

"Banks Find New Efficiency In Retail Delivery", Banking Strategies (formerly The Magazine of Bank Management), Nov., 1996 Sponsored Section; Special Industry Report at p. 121.

"Atalla/Datacard: Bank Branch Automation News", M2 Presswire, Dec. 5, 1996.

Rick Carlin, "Slopes of Change; The Industry Slides Into the Big Business Realm With Faster Lifts, Higher Prices", The Times Union (Albany, NY), Dec. 15, 1996, Sunday, One Star Edition at p. G14.

"Bank of America Pilots New Travel Card", Business Wire, Dec. 19, 1996.

"New Wave Plastic, Using Incentive and Affinity Credit Cards", Jeff Buckstein, (http://www.cba.ca/pub/access/9604/plastic.html), download date: May 28, 1997.

Corporate Hotline Newsletter, "B. A. Takes A Gamble", (http://www.ten-io.com/ . . . /corpnews/7wk2cpio.htm), download date: May 28, 1997.

| CONFIRMATION NUMBER | CUSTOMER NAME | CREDIT INFORMATION | DATES OF RESERVATION | INACTIVE CARD READY? |
|---|---|---|---|---|
| AB472161 | JOHN ANDERSON | VISA 3458 1290 6423 9201 | 4/15/97-4/17/97 | YES |
| TS197222 | DAVE BROWN | AMEX 2201 6510 1143 2088 | 5/07/97-5/08/97 | NO |
| HC219003 | CINDY SMITH | VISA 9872 3378 9910 0638 | 5/11/97-5/13/97 | YES |

FIG. 2

| CUSTOMER NAME | ADDRESS | TRANSACTION HISTORY | CARD ACCEPTED | INCENTIVE SELECTED | INCENTIVE AWARDED |
|---|---|---|---|---|---|
| JOHN ANDERSON | 125 MAIN ST. | STAYED FOR 15 NIGHTS IN 1996 | NO | NONE | NO |
| DAVE BROWN | 255 52ND ST. | SIGNED MARKERS FOR $10,000 | YES | ROOM UPGRADE AND DINNER FOR 2 | YES |
| CINDY SMITH | 185 APPLE LANE | SPENDS AN AVERAGE OF $125 PER DAY | NO | NONE | NO |

FIG. 3

| CREDIT CARD NUMBER | CUSTOMER NAME | CUSTOMER ADDRESS | SPONSORING ORGANIZATION | TOTAL AUTHORIZED CREDIT LINE | SPONSORING ORGANIZATION GUARANTEED CREDIT LINE | ACTIVATED? |
|---|---|---|---|---|---|---|
| VISA 2458 1290 6423 9201 | JOHN ANDERSON | 125 MAIN ST. | GENERAL MOTORS | $8,000 | $2,000 | YES |
| VISA 9872 3378 9910 0638 | CINDY SMITH | 185 APPLE LANE | AMERICAN AIRLINES | $4,000 | $0 | NO |
| VISA 3098 1021 4478 7282 | JOE HARRIS | 416 PARK AVE. | CORNELL UNIVERSITY | $500 | $500 | YES |

INSTANT CREDIT CARD MARKETING SYSTEM FOR RESERVATIONS FOR FUTURE SERVICES

BACKGROUND OF THE INVENTION

The present invention relates to credit card marketing systems, and more particularly, to methods and devices for facilitating easy and inexpensive issuance and activation of credit card accounts.

Credit cards are a powerful financial tool and provide consumers with considerable convenience and flexibility. In 1996 alone, consumers charged more than one trillion dollars on their credit cards. For successful credit card issuers, the credit card business can be very profitable. When profit per cardholder is considered, it is clear why card issuers are so aggressive in their pursuit of new accounts. The average credit card account, for example, had a balance of $1,828.00 in 1996 and earned the credit card issuer an estimated $329.00 a year in interest, in addition to cash advance charges and other fees collected from the consumer. Card issuers generate additional revenue from merchants, in the nature of transaction fees of 2 to 4 percent for every purchase that is charged to a credit card.

With the market for credit card accounts nearly saturated, competition among credit card companies has increased dramatically. Visa alone is estimated to have more than six thousand independent issuers. Accordingly, credit card issuers are constantly searching for new techniques and promotions to encourage new accounts. For example, as an added incentive to open or maintain an account, many credit card issuers offer reward programs that provide cardholders with discounts and free gifts.

Many credit card issuers attempt to attract new customers with various direct marketing promotions. Typically, credit card issuers identify potential customers by analyzing consumer credit histories to identify consumers who are good credit risks. Once customers are identified, an individual credit card issuer will often send many different mail solicitations to each targeted customer. During 1996 alone, credit card companies mailed out more than two billion unsolicited offers for new credit cards to U.S. households, in addition to placing tens of millions of telephone calls, in an attempt to sell consumers on accepting their cards.

While credit card issuers are somewhat successful in obtaining valuable new customers with such direct marketing approaches, it has been found that the vast majority of consumers ignore such promotions, in view of the number of promotions received and the failure of credit card issuers to differentiate their credit card products and various direct marketing promotions. In order to reach valuable new customers, many credit card issuers have turned to affinity partners to help identify credit-qualified new cardholders. Credit card issuers market to an affinity partner's customer base in an attempt to recruit new cardholders meeting the issuer's credit requirements. To motivate the customers to obtain and use an affinity card, the customer often receives special benefits from the affinity partner in return for the use of the card. Airline mileage affinity cards are a well known example of an affinity program, where money charged on the credit card earns frequent flyer miles in the rewards program of the affinity airline.

In 1996, it cost a typical issuer between $60 and $75 to find a customer and open a new Visa or MasterCard account. Gold versions of these cards and high annual fee cards such as those issued by American Express, typically cost issuers more than $100 in direct marketing expenses for each new account established. The issuer's competition for new customers, however, is not over once the account is opened. A significant portion of newly issued cards never get activated, especially since most Visa and MasterCard accounts carry no annual fee. Consumers simply save the cards in a drawer for emergencies or for some future use. In order to obtain any value from the new accounts, however, issuers must seek ways to activate new cards by getting the consumer to make at least one initial charge on their new card.

Another disadvantage associated with conventional credit card issuing systems is the time delay between the initial filing of a credit application by a customer and the subsequent receipt of an actual credit card. It has been found that such time delays provide customers with an opportunity to reconsider their request, which has contributed to the failure of customers to activate newly issued credit cards, and further results in lost opportunities for credit transactions for the issuer, because the customer must charge transactions during the time delay period to another credit card or pay cash. The issuers of proprietary credit cards, such as retailers, have attempted to overcome this time delay problem by issuing a temporary credit card to a newly approved customer. With such systems, however, the proprietary credit card issuer cannot perform a complete evaluation of the customer's credit while the customer is waiting to complete a transaction and will only authorize a new account if the customer has an acceptable credit history with one or more general purpose credit cards.

U.S. Pat. No. 5,569,897 to Masuda, entitled "Credit Card System and Method of Issuing Credit Card Using Such a System" (hereinafter, the "Masuda System"), discloses a credit issuing system that permits credit cards to be instantly issued to an approved customer from a supply of preprinted retail credit cards which are stocked in a retail store. The Masuda System, however, requires a credit check be performed while the customer is waiting to complete the transaction, a process which could take several minutes. This credit checking process described by Masuda requires an online system which may incur delays if credit history or information is incomplete or unavailable.

The problems and costs associated with current methods for acquiring new credit card accounts are not limited to issuers. Even from the consumer's point of view, conventional card acquisition techniques are unsatisfactory. Many consumers are confused and discouraged by the repeated attempts by various card issuers to solicit the consumer's business through repetitive direct marketing efforts. In addition, consumers are often frustrated by the long delay between submitting an application to an issuer and receipt of the actual credit card. Furthermore, many consumers hesitate to apply for credit cards for fear of being embarrassed by rejection.

As apparent from the above-described deficiencies with conventional systems for acquiring new credit card customers, a need exists for a system that will allow credit card issuers to instantly issue credit cards to credit-qualified new customers. A further need exists for a system that allows issuers to encourage instant activation of newly issued credit cards. Yet another need exists for a system which encourages consumers to utilize new credit cards by instantly issuing and activating a new credit card as part of a chargeable event. A further need exists for a credit card issuing system which allows affinity partners to receive credit cards in anticipation of the arrival of a potential credit card customer, so that the credit card can be physically handed over to the consumer and activated as part of a chargeable event.

SUMMARY OF THE INVENTION

To address these concerns and limitations, methods and apparatus for preauthorizing and issuing a line of credit consistent with one embodiment of this invention allow a sponsoring organization, such as an affinity partner, to pre-approve its customers, seek a line of credit on their behalf, offer the customer the line of credit at a time of personal contact with the sponsoring organization, and issue the customer a credit card with the pre-approved line of credit that is also activated for immediate use as part of a chargeable event.

Specifically, a credit requesting system consistent with an embodiment of this invention comprises means for receiving a reservation for future services and creating a customer record including information about the reservation; means for transmitting the customer information to a credit provider with a request for a line of credit and receiving from the credit provider an indication that the line of credit has been approved; and means for indicating the credit status of the customer.

A method for requesting credit for a customer consistent with this invention includes receiving a reservation for future services from a customer; creating a first data record including information about the customer and the reservation; transmitting the customer information to a credit provider as part of the request for credit for the customer; receiving from the credit provider an indicator that credit has been approved or denied; and creating a second data record indicating credit status for the customer.

A computer readable medium consistent with this invention includes a computer readable program code comprising means for causing a computer to receive a reservation for future services from a customer; means for causing a computer to create a first data record including information about the customer; means for causing a computer to transmit the customer information to a credit provider as part of a request for a credit for the customer;

means for causing a computer to receive from the credit provider an indication whether the credit line for the customer has been approved; and means for causing a computer to create a second data record indicating a credit status for the customer.

A method for requesting credit for a customer consistent with the present invention comprises the steps of receiving a reservation for future services from the customer; creating a first data record in a central facility including information about the customer and the reservation; transmitting the customer information to a credit provider as part of a request for a credit for the customer; receiving from the credit provider an indicator that the credit has been approved or denied; and creating a second data record indicating credit status for the customer.

A method for establishing a credit line for a customer consistent with this invention includes identifying a potential customer who is expected at a remote location, evaluating the credit of the customer, providing a credit card to the remote location where the customer is expected, if a credit line is approved, and then initiating an offer of said credit card to the customer while the customer is at the remote location.

A method for activating a credit line for a customer consistent with this invention includes providing a credit card to a remote location where a potential customer is expected, initiating an offer of the credit card to the customer while the customer is at the remote location, and activating the credit card with a purchase at the remote location.

A method for requesting credit for a customer consistent with this invention includes identifying a customer who is expected to arrive at a particular location, requesting a line of credit for the customer from a credit provider, obtaining a credit card from the credit card provider if said line of credit was approved, and offering the credit card to the customer while the customer is at the location.

A method for requesting credit for a customer consistent with this invention includes obtaining a credit card from a credit card provider for a customer who is expected to arrive at a particular location, offering the credit card to the customer while the customer is at the location and activating the credit card with a purchase at the location.

Additional advantages of the invention will be set forth in part in the description that follows and in part will be obvious from the description or may be learned by practice of the invention. The advantages of the invention will be realized and attained by means of the elements and combinations particularly pointed out in the appended claims. Both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, explain the principles of the invention.

DETAILED DESCRIPTION OF THE INVENTION

A. Introduction

Reference will now be made in detail to the preferred embodiments of the invention, examples of which are illustrated in the accompanying drawings. Wherever possible, the same reference numbers will be used throughout the drawings to refer to the same or like parts.

The operation of the system will be described with respect to a casino-hotel as an affinity partner, but may apply to any merchant, organization or service provider able to identify the anticipated arrival of potential customers, members or patrons and provide an incentive to activate new accounts (collectively, the "sponsoring organizations"). Generally, the sponsoring organization may be any organization with whom potential customers typically make advance reservations, such as a hotel, car rental company, airline, or any organization with whom members, patrons or customers typically register in advance for attendance at an event, such as a ticket holder for a professional sports event or a participant in a seminar or tournament presented by the sponsoring organization. In further embodiments of the invention, the sponsoring organization can include any merchant or service provider who can anticipate the arrival of a customer at a particular location, for example, (a) a customer who comes to a retail location on a periodic basis, (b) a customer who drops off goods with a merchant, such as a dry cleaner or a repair man, for later pick up, and (c) a customer who has scheduled a service, such as the installation of a telephone or cable service in the customer's home or office. Likewise, the credit provider is described as an issuing bank, but can be any qualified lending institution. In the preferred embodiment, the credit provider is a credit card issuer.

In the illustrative casino-hotel embodiment, potential new accounts are identified through the routine hotel reservation process. When a customer makes a reservation at a hotel, the hotel requests a credit card on the customer's behalf. If the issuing bank approves a credit line, a plastic credit card is shipped to the hotel, and the hotel offers the card to the customer upon check-in, or at any time during the customer's stay at the hotel. At check-in, the customer offered an to incentive apply for and accept the pre-approved card by choosing from a menu of special benefits available upon immediate use of the card, such as an immediate room upgrade, free food or beverages, and incentives for use at the gaming tables and slot machines.

The amount of credit to offer the customer may be determined any one of a number of ways. The sponsoring organization, for example, may simply request that the issuing bank provide a credit card. The sponsoring organization, however, may also make a determination as to what level of credit the customer should be offered and suggest a level of credit to the issuing bank. In one embodiment of the present invention, the sponsoring organization also may choose to guarantee an amount of credit over that offered by the issuing bank.

B. System Components

Figure 1A:
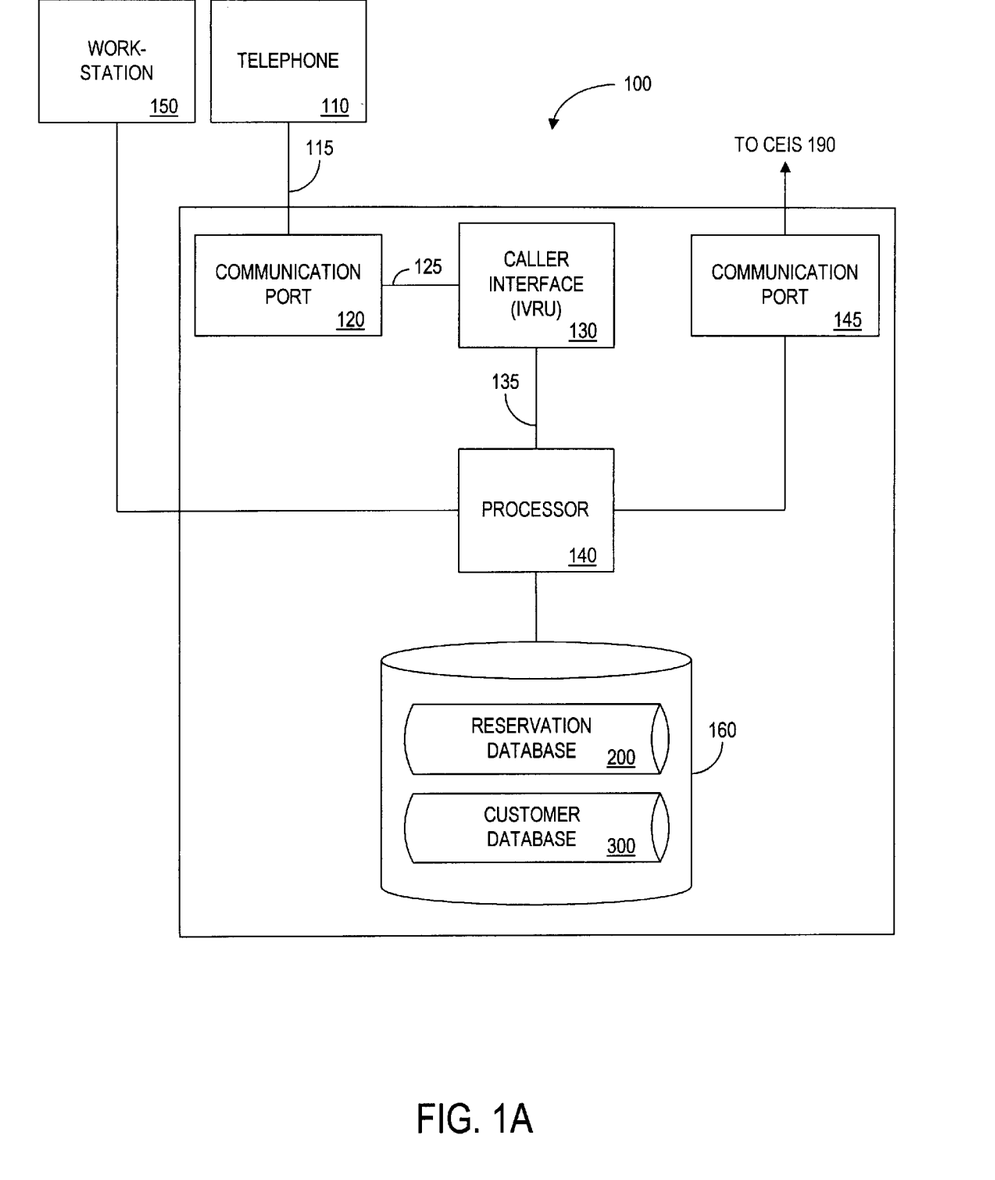
FIG. 1A is a schematic block diagram illustrating a reservation and credit requesting system used by a sponsoring organization consistent with the present invention.
Figure 1B:
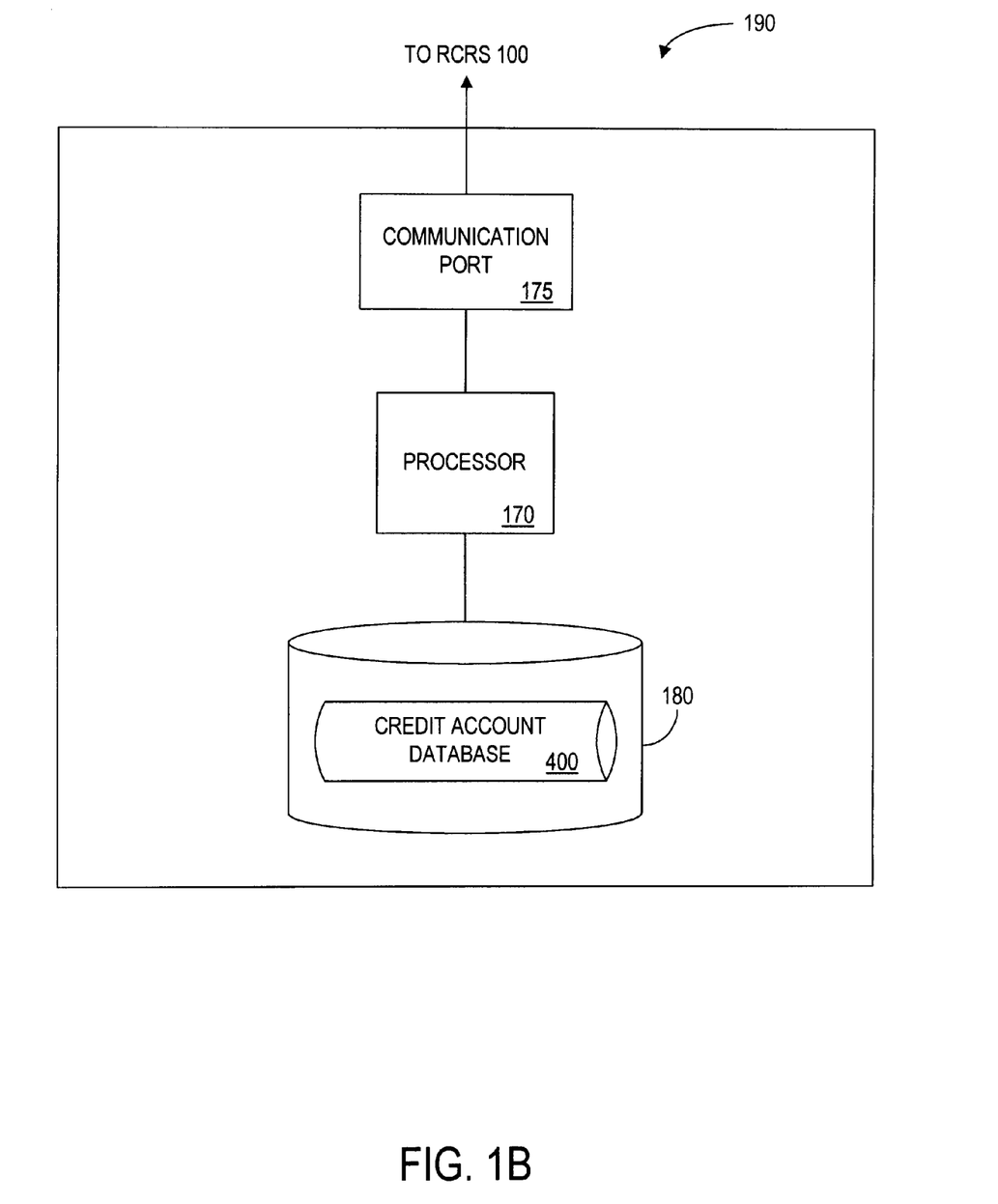
FIG. 1B is a schematic block diagram illustrating a credit evaluation and issuing system used by the issuing bank consistent with the present invention.

FIGS. 1A and 1B illustrate the components of a system consistent with the present invention. Generally, the system includes a reservation and credit requesting system ("RCRS") 100 [FIG. 1A], operated by the sponsoring organization, or another affinity partner. For the purposes of illustration, a casino-hotel embodiment is described in which the functions of RCRS 100 are incorporated into the reservation system of the hotel. The system also includes a credit evaluation and issuing system ("CEIS") 190 [FIG. 1B], operated by a credit issuing bank.

As shown in FIG. 1A, the RCRS system includes a communications port 120 connected to a caller interface preferably embodied using an interactive voice response unit ("IVRU") 130, a communications port 145 for coupling to CEIS 190, a data storage device 160, and a processor 140. These elements are connected appropriately, for example, by a standard system bus, to allow communications between them. Customers can communicate with RCRS 100 via a telephone 110. Customers may also make reservations by any suitable mechanism, such as electronic mail or facsimile.

Data is entered into and retrieved from RCRS system processor 140 through IVRU 130, and/or using one or more workstations 150. Each workstation 150 can be a personal computer (PC) or other hardware that includes a visual display device and data entry device such as a keyboard or mouse.

FIG. 1B is a block diagram of the components of CEIS 190. CEIS 190 includes a processor 170, a communication port 175, and a data storage device 180. These elements are connected appropriately by a standard system bus to allow communications between them.

The blocks labeled as communication ports 120, 145 and 175 are intended to represent a broad range of well known apparatuses operable to permit communication between data processing systems. One of ordinary skill in the art would readily understand that a term such as "communication ports" could have a range of meanings encompassing simple data in and out pins on a microprocessor all the way up to complex broadband Asynchronous Transfer Mode switches and beyond. However, in the preferred embodiment of the present invention, communication between data processing systems is preferably implemented using modems. IVRU 130 is preferably a conventional system such as those manufactured by Northern Telecom. The blocks labeled processers 140 and 170 are intended to represent a broad range of data processing systems that preferably include a processor and the associated hardware including memory devices, bus controllers, and other well known components typically used to perform data processing functions. In the present invention, these "processors" are preferably conventional computers or network servers with sufficient memory and processing capability to perform the disclosed functionality. Data storage devices 160 and 180 may include hard disk, magnetic, or optical storage units, as well as CD-ROM drives or flash memories. Both devices contain databases used in processing transactions consistent with the present invention. Data storage device 160 includes reservation database 200 and customer database 300. Data storage device 180 contains credit account database 400.

Figure 2:
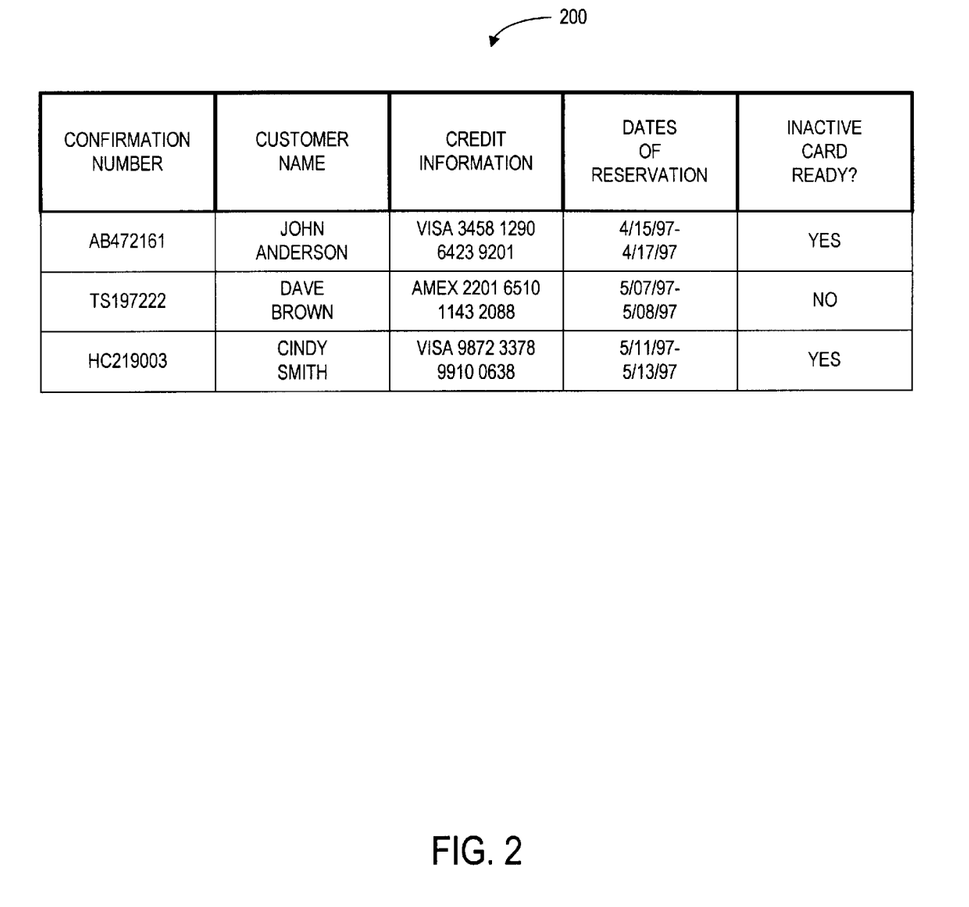
FIG. 2 illustrates a reservation database for the system in FIG. 1A.
Figure 3:
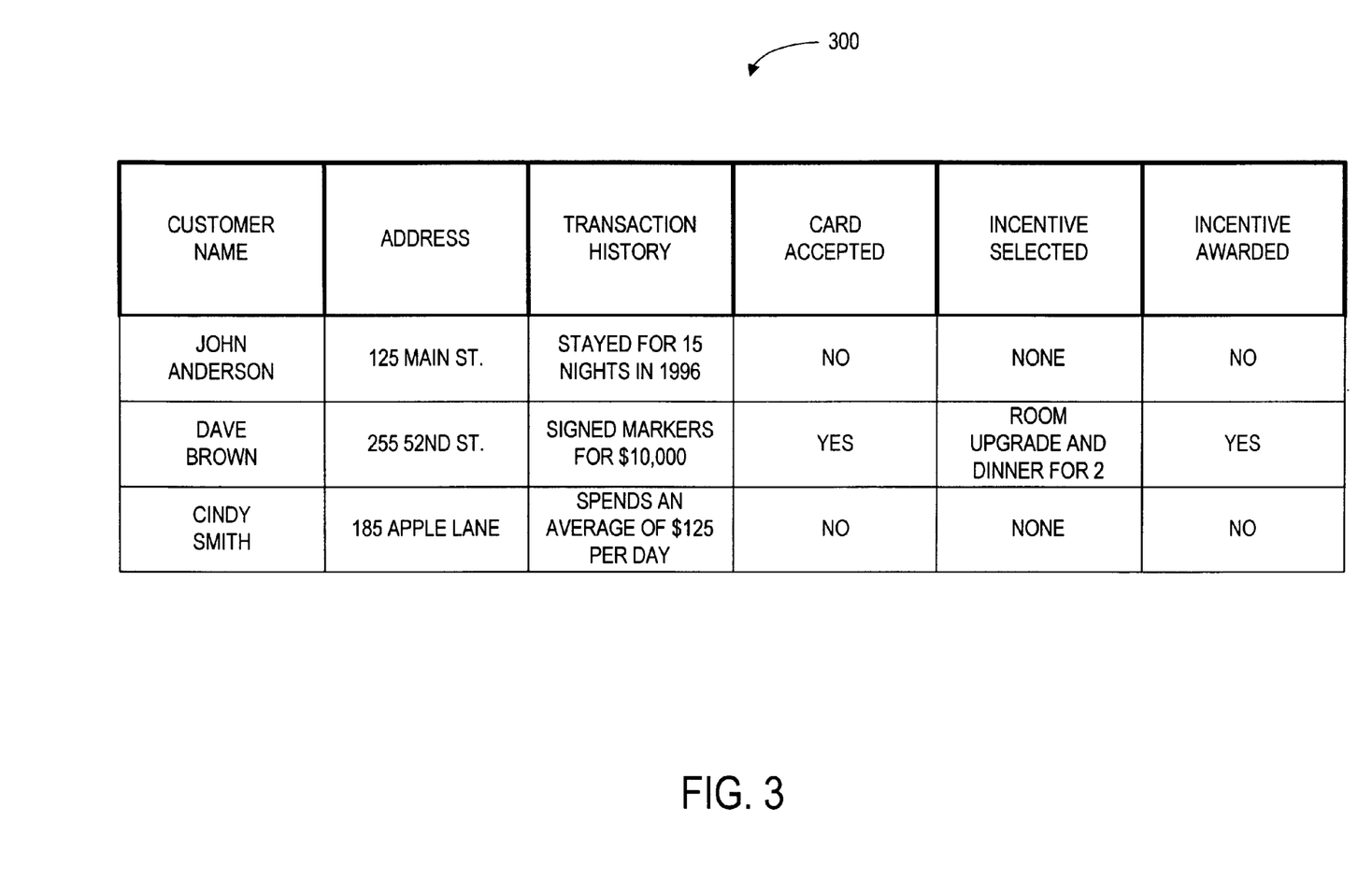
FIG. 3 illustrates a customer database for the system in FIG. 1A.
Figure 4:
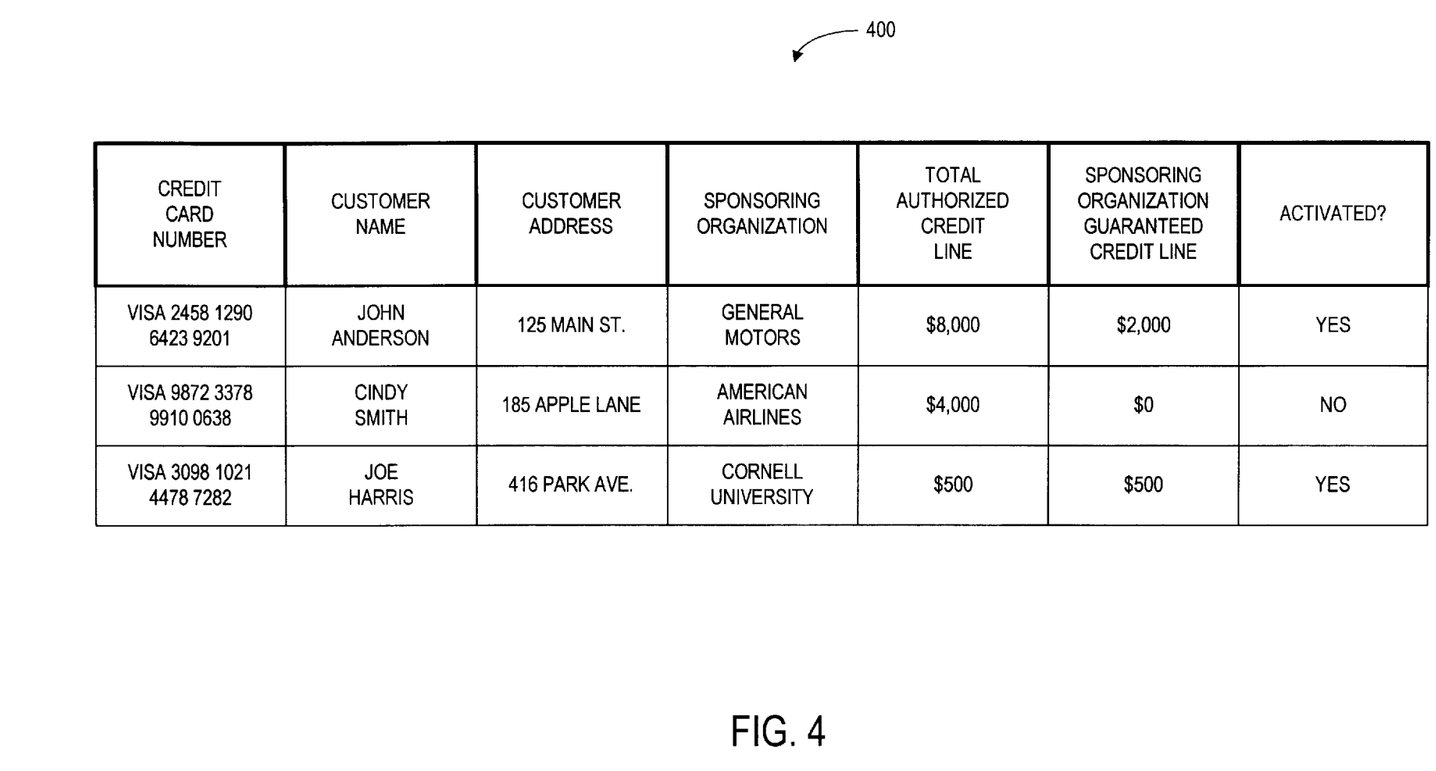
FIG. 4 illustrates a credit account database for use with the system in FIG. 1B.

Samples of the contents of databases 200, 300 and 400 are shown in FIGS. 2–4. The specific data and fields illustrated in these figures represent only one possible embodiment of the records stored in the databases of the invention. The data and fields of these databases, as well as the number of databases, can be readily modified from the described embodiment.

FIG. 2 provides a structural diagram of an exemplary reservation database 200. Reservation database 200 maintains information on the customer's reservation for future service, and includes fields for a confirmation number, customer name, credit information (including currently held credit cards), dates of arrival and departure, and a card status indicating whether the customer has been pre-approved for a credit card. It is noted that in alternate embodiments, where the sponsoring organization is an organization with whom members, patrons or customers typically register in advance for attendance at an event, or a merchant or service provider who can anticipate the arrival of a customer at a particular location, the reservation database 200 may be embodied more generically as an attendee database (not shown) or roster and include fields for confirmation number, customer name, credit information, expected dates of attendance or arrival, and a field indicating whether the customer has been pre-approved for a credit card.

FIG. 3 illustrates an example of customer database 300. Customer database 300 stores information on previous transactions between the sponsoring organization and the customer. Customer database 300 may include fields for customer name, customer address, previous transactions between the customer and the sponsoring organization, whether the customer previously accepted a credit card, the type of incentive selected and previous incentives awarded for any previously issued credit card.

FIG. 4 shows an example of a credit account database 400. Credit account database 400 stores information related to the credit line offered by the issuing bank to the customer. Credit account database 400 may include fields for credit account number, customer name, customer address, name of the sponsoring organization which requested the card on behalf of the customer, the total authorized credit line, the amount of the credit line guaranteed by the sponsoring organization, and whether the line of credit has been accepted by the customer and the account activated.

C. Process

Figure 5A:
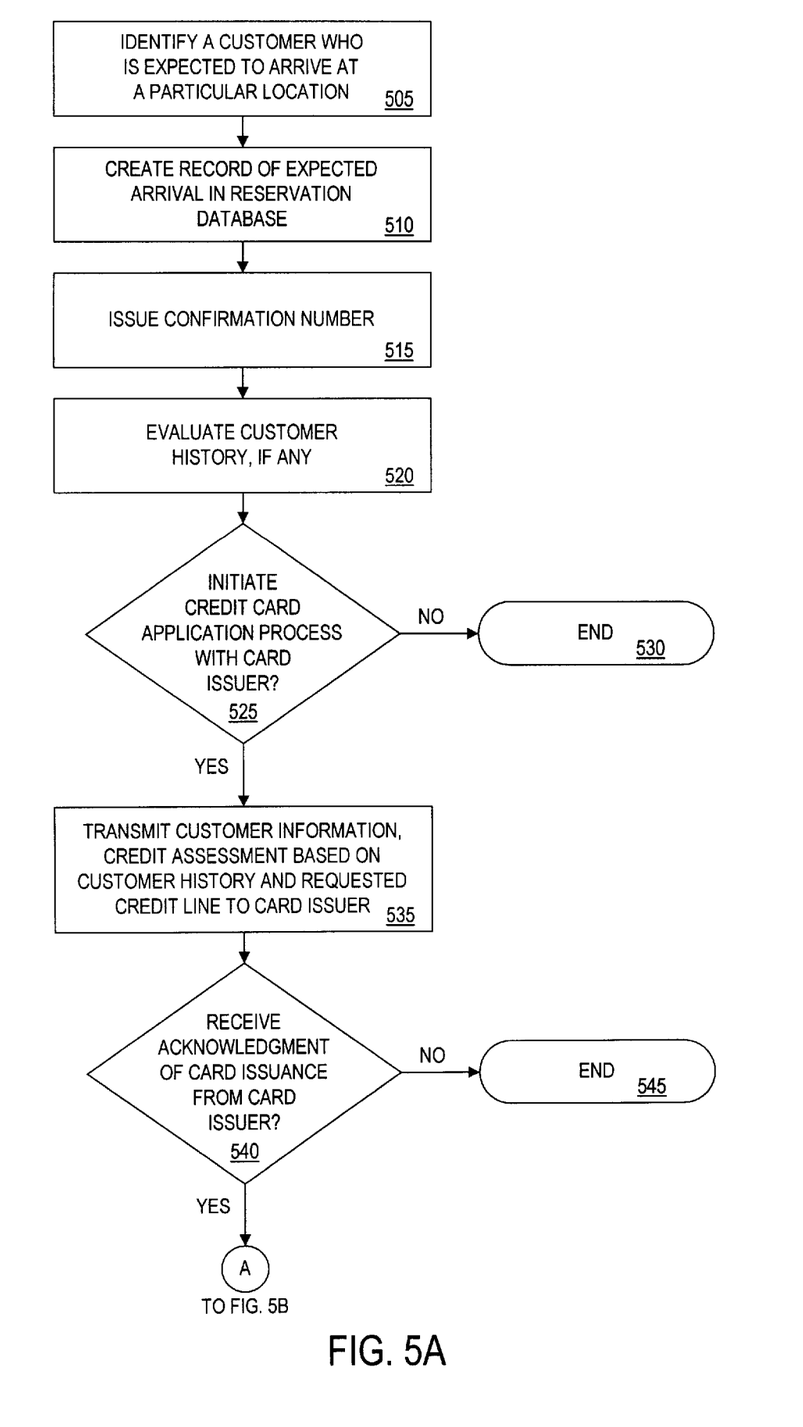
FIGS. 5A–5C contain a flow chart describing an exemplary reservation and credit requesting process consistent with the present invention.
Figure 5B:
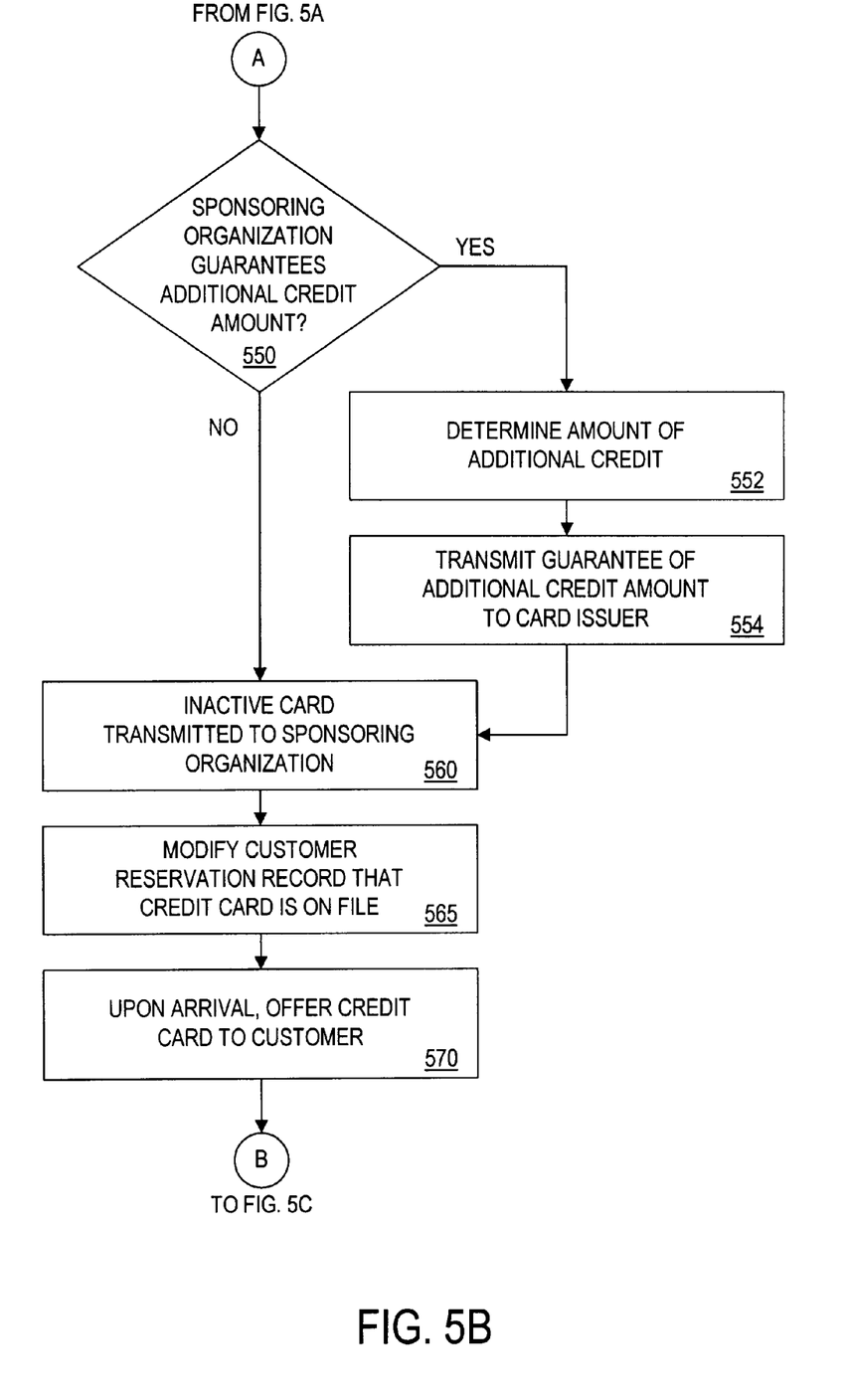
Figure 5C:
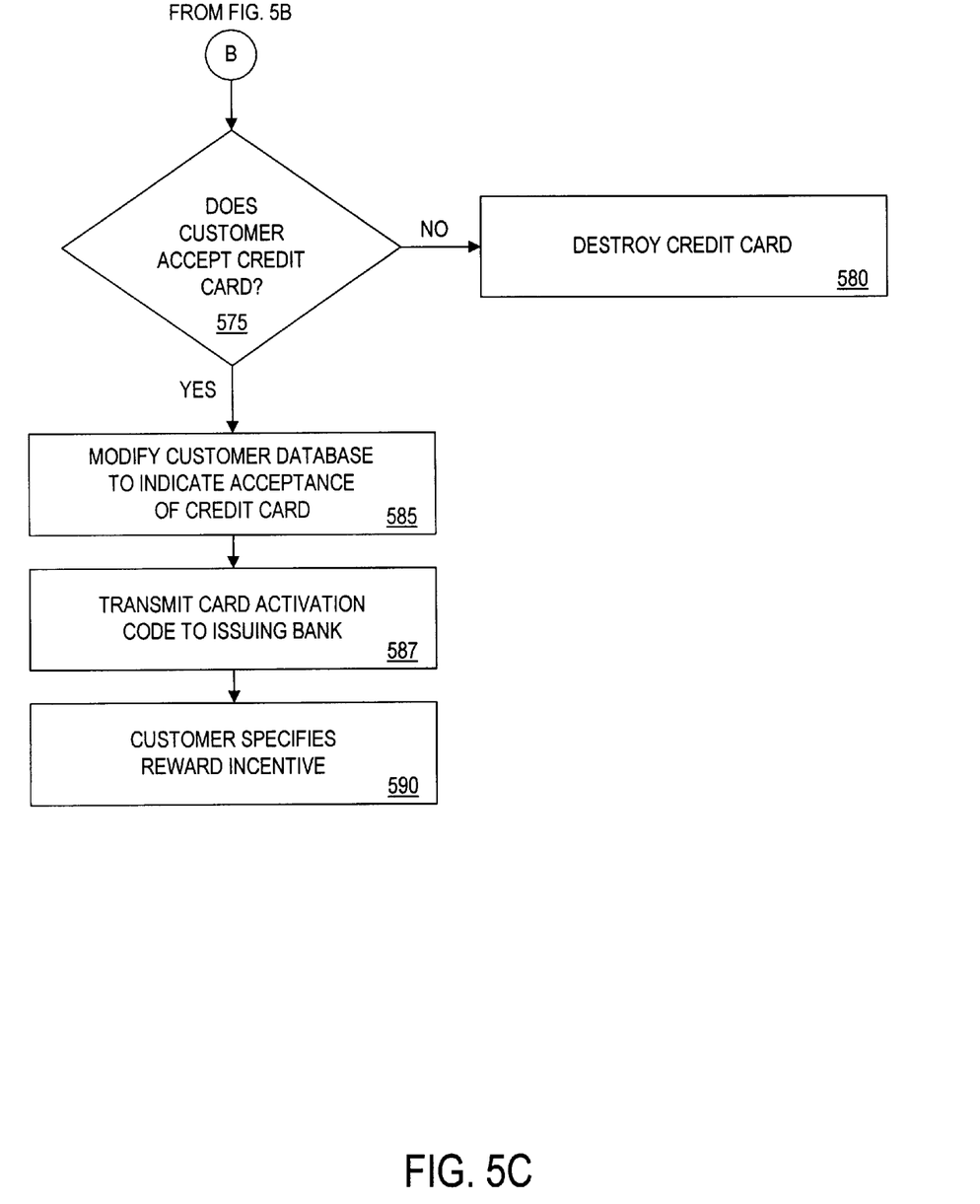

FIGS. 5A–5C include a flow chart for a reservation and credit requesting process executed by a sponsoring organization consistent with this invention. First, a sponsoring organization identifies a customer who is expected to arrive at a particular location. [Step 505] In the illustrative casino-hotel embodiment, the hotel identifies an expected customer by receiving a reservation from him. The customer may make the reservation either by communicating directly with IVRU 130, or through a live reservation agent. The customer provides the reservation agent or RCRS 100 with certain information as part of the reservation process, including his name, home address and, optionally, a credit card number.

The customer data is entered into processor 140 of RCRS 100 by an agent using workstation 150, or through IVRU 130. RCRS 100 then creates a customer record in reservation database 200. [Step 510] The customer record data entered into reservation database 200 may include such information as customer name, address, credit information, dates of arrival and departure, and a confimnation number. Upon creating the customer record, the agent provides the confirmation number to the customer. [Step 515].

At this point, RCRS 100 may use the customer-supplied information to search customer database 300 and determine, for example, whether the customer previously has patronized the sponsoring organization or currently possesses a credit account. The sponsoring organization evaluates any available information on the customer [Step 520] and may use this information in deciding whether to initiate the process of obtaining credit for the customer. [Step 525] For example, a casino-hotel may examine payment history for gambling markers, with customers having made timely payments selected for an offer of new credit. Additionally, the casino-hotel may use customer information to make a determination as to what level of credit the customer should be offered. Casino "high rollers," for example, might warrant a request for a higher level of credit. If the casino-hotel decides not to initiate the credit card application process, the process terminates. [Step 530]

Having decided to initiate a credit card application on the customer's behalf, RCRS 100 at the casino-hotel sends a request for a credit card, along with certain information about the customer, to CEIS 190 of the issuing bank. [Step 535] The customer information passed to CEIS 190 may include, for example, the customer's name, address, and credit card information. The sponsoring organization may also pass along other information about the customer, such as a credit assessment based on customer's transaction history with the sponsoring organization or a suggested level of credit, if one was determined in Step 520. CEIS 190 may use the information to evaluate the customer in a manner similar to the process described below. If RCRS 100 does not receive an acknowledgment [Step 540] with an authorized credit line from CEIS 190, or if CEIS 190 denies all credit for the customer, the process is terminated. [Step 545] If RCRS 100 receives a response from CEIS 190 with an authorized credit line, the sponsoring organization then waits for receipt of the inactive credit card.

Referring now to FIG. 5B, in an alternative embodiment the sponsoring organization may decide that it wants to offer the customer credit in addition to that offered by the bank. [Step 550] If so, the sponsoring organization determines how much additional credit it should offer in Step 552. If the customer information transmitted to CEIS 190 in Step 535 included a requested credit line, for example, RCRS 100 of the sponsoring organization may use this information to determine whether the credit line authorized by the issuing bank is equal to the requested credit line. If CEIS 190 authorized an amount of credit less than that requested by RCRS 100, the sponsoring organization may decide that it wants to guarantee the difference. If the sponsoring organization decides to guarantee any amount of additional credit, RCRS 100 transmits a guarantee of the additional credit to CEIS 190. [Step 554]

The sponsoring organization may instead decide to segregate the lines of credit, that is, offer a general line of credit to be used by the customer at facilities other than those operated by the sponsoring organization and a separate line of credit which may only be utilized at the sponsoring organization. In this case, the sponsoring organization may decide to limit its guarantee of a portion of the extended credit to purchases made on the sponsoring organization specific credit line. Additionally, the sponsoring organization may arrange with the issuing bank to earn a higher commission on interest payments made by the customer for balances carried on the sponsoring organization specific credit line, or balances carried on the portion of the general credit line guaranteed by the sponsoring organization.

If the sponsoring organization decides not to guarantee additional credit, or no additional guarantee is necessary because the issuing bank authorized the entire amount of the requested credit, the sponsoring organization receives inactive credit cards from the issuing bank for each approved customer. [Step 560] Upon receipt of the inactive credit cards, an agent of the sponsoring organization modifies the customer's reservation record in reservation database 200 of RCRS 100 to indicate to employees to offer the credit card to the customer upon arrival, or otherwise while the customer is present at the facilities of the sponsoring organization. [Step 565] In a preferred embodiment, the credit card offer is made to the customer as part of a chargeable event, in order to facilitate activation of the credit card.

The credit card is held for the arrival of the customer by the sponsoring organization. Although the problem of theft is minimal because the credit account is inactive until the customer applies for the card and the card is activated, the inactive credit cards preferably should be stored in a secure area. When the customer arrives at the sponsoring organization, such as checking into the hotel, an employee will see a notification in the customer's computerized reservation record that a credit card is available and offer the credit card (and accompanying line of credit) to the customer. [Step 570] The reservation software may be programmed so as to prompt the employee to offer the customer the credit card.

With reference to FIG. 5C, if the consumer declines the offer of credit [Step 575], the process ends and the inactive plastic credit card is destroyed. [Step 580] If the customer accepts the credit card offer, the employee retrieves the prepared plastic card from the secure storage location. The employee indicates the customer's acceptance of the new card by modifying the card acceptance field of customer database 300. [Step 585] The customer may be asked to sign a credit card application prior to receiving the card. The card activation code is then transmitted to CEIS 190. [Step 587]

Additionally, customers may be given the option to specify the incentives of the reward program that they prefer. [Step 590] In the illustrative casino-hotel embodiment, the customer may want to earn free money for slot machine play, free hotel shows or meals, or free room nights at the hotel. The customer's selections may then be entered into customer database 300 and stored in data storage device 160. The incentive may require the customer to immediately use and hence activate the card, and/or the customer may be encouraged to use the new credit card to pay for the current visit to the hotel, thereby creating an immediate charge to the account, another feature and advantage of the present invention.

Figure 6A:
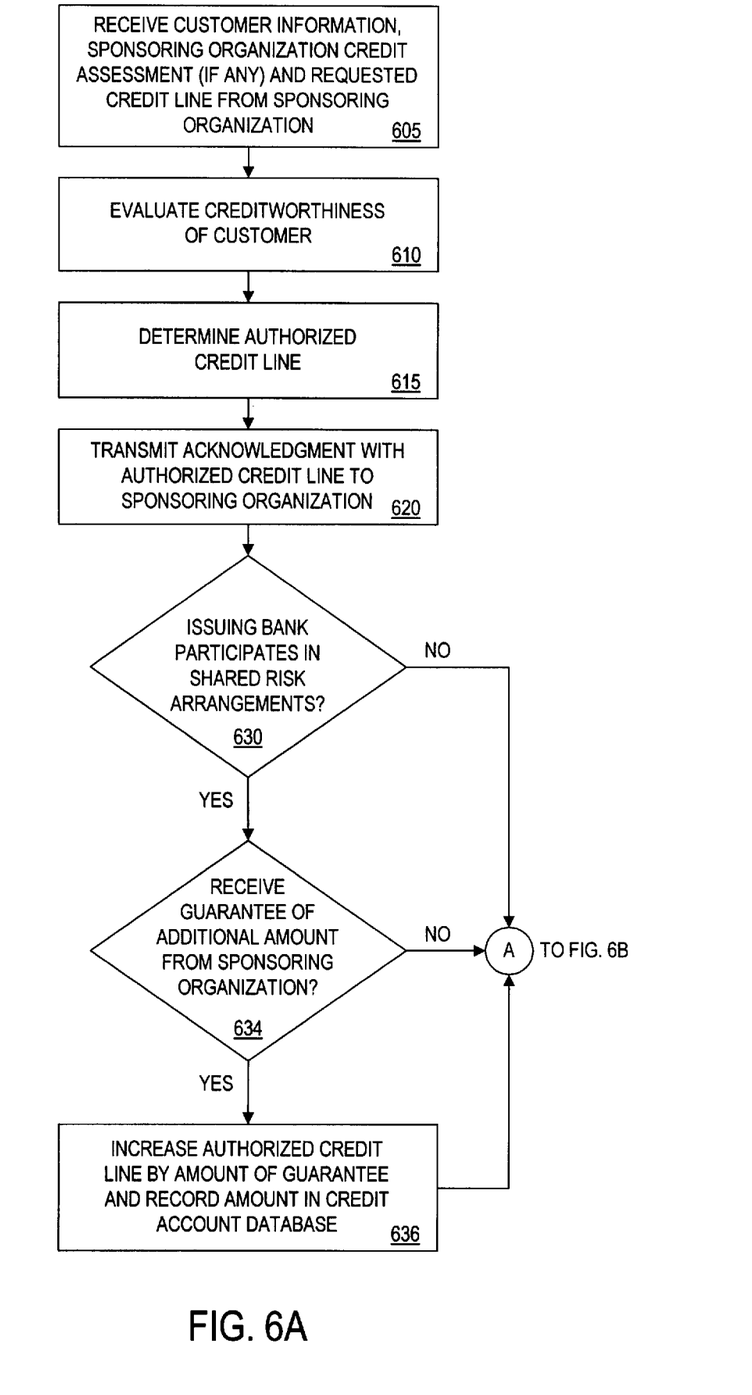
FIGS. 6A and 6B contain a flow chart describing an exemplary credit evaluation and issuing process consistent with the present invention.
Figure 6B:
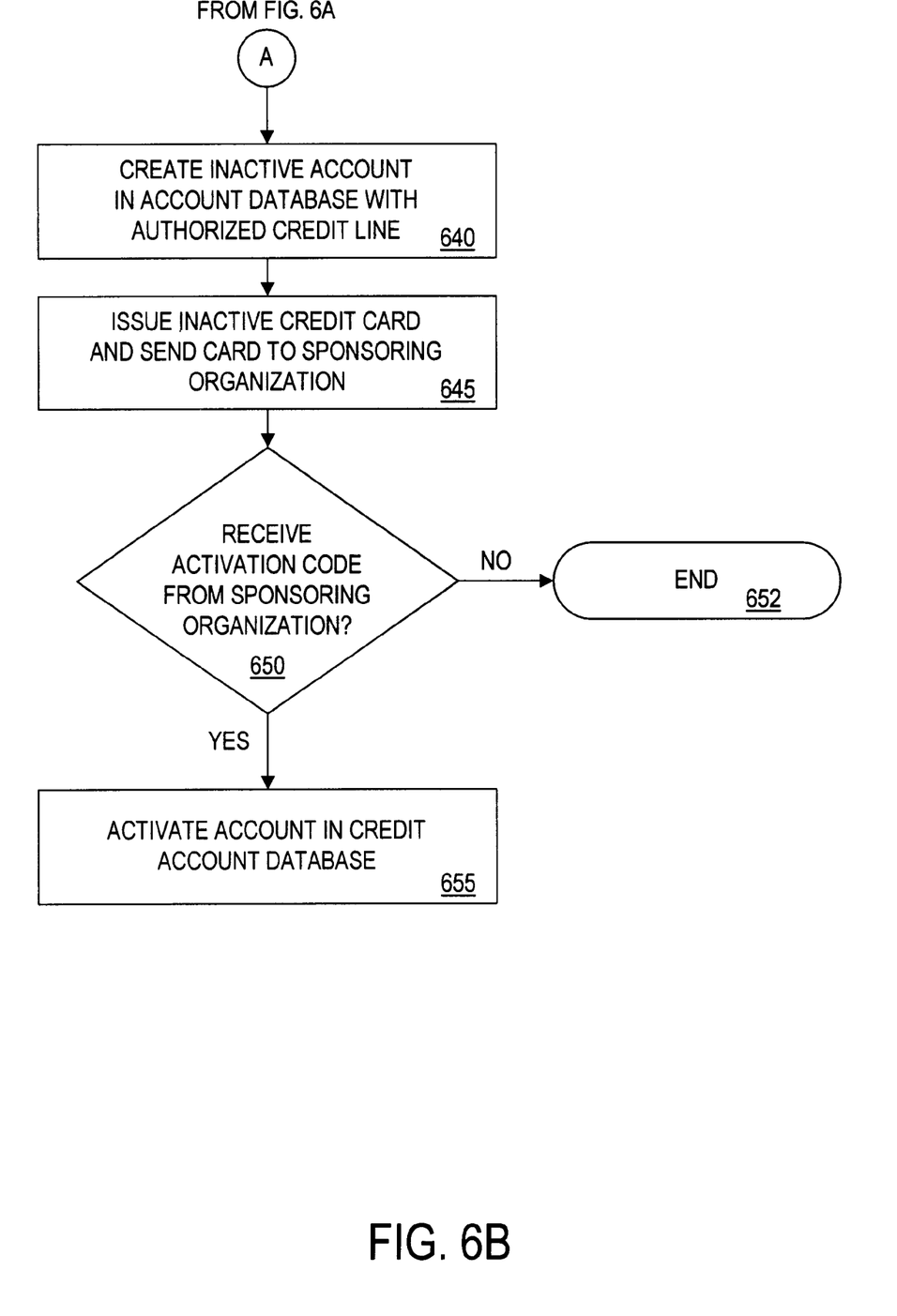

FIGS. 6A and 6B illustrate the process of CEIS 190 of the issuing bank receiving the customer information and responding to the request for credit. To begin the process, CEIS 190 receives the customer information and request for credit from RCRS 100. [Step 605] CEIS 190 may use the customer and credit information provided by RCRS 100 and other credit verifying procedures to evaluate the customer's creditworthiness to decide whether to offer a credit card to the customer. [Step 610] CEIS 190 also may search credit account database 400 in data storage device 180 for records of previous transactions with the customer. CEIS 190 also may contact other credit reporting agencies or institutions, such as TRW or Equifax, for additional information.

Based on this evaluation, CEIS 190 decides on the amount of credit that the issuing bank is willing to offer the customer [Step 615], and transmits a notification of the authorized credit line to RCRS 100 of the sponsoring organization. [Step 620] If the sponsoring organization and issuing bank do not participate in the optional shared risk arrangement described above, the issuing bank proceeds with creating an inactive credit account. [Step 640] In an alternate embodiment, the issuing bank may participate in a shared risk arrangement and may offer the sponsoring organization an opportunity to guarantee an additional amount over that offered by the issuing bank. [Step 634] If the sponsoring organization decides to secure an additional amount of credit that it would like the customer to have, the sponsoring organization gives the issuing bank a guarantee of coverage for losses over the credit amount offered by the issuing bank. [Step 634] CEIS 190 then increases the authorized credit line by the amount of the guarantee [Step 636] and records the amount of credit guaranteed by the sponsoring organization in credit account database 400.

In both instances, CEIS 190 creates an inactive customer account in credit account database 400 with an authorization of credit [Step 640], issues an inactive credit card, and sends the credit card to the sponsoring organization. [Step 645] In this case, the credit card may serve as an indicator to the sponsoring organization that the issuing bank has agreed to provide credit to the customer. If the customer accepts the line of credit, CEIS 190 receives an indicator from RCRS 100 to activate the account. [Step 650] CEIS 190 activates the previously created account [Step 655] and indicates that the account is activated in credit account database 400. If the activation code is not received, the account in credit account database 400 remains inactive. [Step 652]

D. Conclusion

It will be apparent to those skilled in the art that various modifications and variations can be made in the system and processes of the present invention without departing from the spirit or scope of the invention. In addition to the illustrative casino-hotel embodiment discussed herein, the sponsoring organization may be, for example, any organization with whom members, patrons or customers typically register in advance for attendance at an event, or any merchant or service provider who can anticipate the arrival of a customer at a particular location.

The present invention covers the modifications and variations of this invention provided they come within the scope of the appended claims and their equivalents. In this context, equivalents means each and every implementation for carrying out the functions recited in the claims, even those not explicitly described herein.

We claim:

1. A credit requesting system comprising:

means for receiving a reservation for future services from a customer;

means for creating in a central facility a first data record including information about the customer;

means for transmitting the customer information to a credit provider as part of a request for a line of credit for the customer;

means for receiving from the credit provider an indication whether the line of credit has been approved for the customer; and means for creating a second data record indicating a credit status for the customer.

2. The system of claim 1, further comprising means for indicating acceptance of the line of credit by the customer; and means for transmitting to the credit provider an activation code reflecting acceptance by the customer of the line of credit.

3. The system of claim 1, further comprising means for evaluating the customer information to pre-screen the customer to determine whether to transmit the customer information to the credit provider.

4. The system of claim 1, wherein the means for creating the first data record includes means for recording a line of credit amount as part of the customer information.

5. The system of claim 1, wherein means for creating the first data record includes means for storing, as part of the customer information, a customer transaction history.

6. The system of claim 1, further comprising means for receiving from the credit provider an indication of an amount of credit the credit provider is willing to authorize.

7. The system of claim 6, further comprising means for transmitting to the credit provider a guarantee of a credit amount over the authorized amount of credit.

8. The system of claim 1, further comprising means for offering financial incentives to the customer to accept the credit line.

9. The system of claim 8, further comprising means for giving the customer the financial incentives.

10. A method for requesting credit for a customer comprising the steps of:

receiving a reservation for future services from the customer;

creating a first data record in a central facility including information about the customer and the reservation;

transmitting the customer information to a credit provider as part of a request for a line of credit for the customer;

receiving from the credit provider an indicator that the line of credit has been approved or denied; and creating a second data record indicating a credit status for the customer.

11. The method of claim 10, further comprising receiving acceptance of the line of credit by the customer; and transmitting to the credit provider an activation code reflecting acceptance by the customer of the line of credit.

12. The method of claim 10, further comprising evaluating the customer information to prescreen the customer to determine whether to transmit the customer information to the credit provider.

13. The method of claim 10, wherein the step of creating the first data record includes recording a requested line of credit amount as part of the customer information.

14. The method of claim 10, wherein the step of creating the first data record includes storing, as part of the customer information, a customer transaction history.

15. The method of claim 10, further comprising receiving from the credit provider an indication of an amount of credit the credit provider is willing to authorize.

16. The method of claim 15, further comprising transmitting to the credit provider a guarantee of a credit amount over the authorized amount of credit.

17. The method of claim 10, further comprising offering financial incentives to the customer to accept the credit line.

18. The method of claim 17, further comprising giving the customer the financial incentives.

19. A computer readable medium having a computer readable program code comprising:

means for causing a computer to receive a reservation for future services from a customer;

means for causing a computer to create a first data record including information about the customer;

means for causing a computer to transmit the customer information to a credit provider as part of a request for a credit line for the customer;

means for causing a computer to receive from the credit provider an indication whether the credit line for the customer has been approved; and means for causing a computer to create a second data record indicating a credit status for the customer.

20. The medium of claim 19, further comprising means for causing a computer to receive acceptance of the line of credit by the customer; and means for causing a computer to transmit to the credit provider an activation code reflecting acceptance by the customer of the line of credit.

21. The medium of claim 19, wherein the means for causing the computer to create the first data record includes means for causing the computer to record a requested line of credit amount as part of the customer information.

22. The system of claim 19, further comprising means for causing the computer to receive from the credit provider an indication of an amount of credit the credit provider is willing to authorize; and means for causing the computer to transmit to the credit provider a guarantee of a credit amount over the authorized amount of credit.

23. A credit line issuing system comprising:

means for receiving from a sponsoring organization customer information and a request for a credit line for a customer;

means for determining whether the customer should be offered the credit line;

means for transmitting an indication to the sponsoring organization whether the credit line has been approved for offer to the customer;

means for creating a customer account including information about the customer and the credit line offer to the customer; and means for activating the customer account upon receipt of an indicator from the sponsoring organization that the customer accepts the offer of the credit line as part of a chargeable event with the sponsoring organization.

24. The system of claim 23, wherein the means for receiving customer information includes means for receiving from the sponsoring organization as part of the customer information a previous transaction history of the customer.

25. The system of claim 23, wherein the means for receiving customer information includes means for receiving from the sponsoring organization as part of the customer information a requested line of credit.

26. The system of claim 23, further comprising means for offering the customer financial incentives to accept the credit; and means for receiving an indication of acceptance of the financial incentives by the customer.

27. The system of claim 23, further comprising means for transmitting to the sponsoring organization an indication of an authorized line of credit for the customer.

28. The system of claim 27, further comprising means for receiving a guarantee from the sponsoring organization of responsibility for amounts over the authorized line of credit.

29. The system of claim 28, further comprising means for increasing the authorized credit line by an amount equal to the guarantee.

30. A method for issuing a line of credit comprising the steps of:

receiving from a sponsoring organization a request for a line of credit for a customer having a reservation for future services with the sponsoring organization;

evaluating the creditworthiness of the customer to determine whether to offer the customer a line of credit;

transmitting to the sponsoring organization an indication whether a credit line for the customer has been approved;

creating a customer account including information about the customer; and activating the customer account upon receipt from the sponsoring organization of an indication that the customer has accepted the credit line offer.

31. The method of claim 30, further comprising receiving from the sponsoring organization a guarantee of credit amount over the credit line; and indicating the guarantee in the customer account.

32. A computer readable medium having a computer readable program code comprising:

means for causing a computer to receive from a sponsoring organization a request for a line of credit for a customer having a reservation for future services with the sponsoring organization;

means for causing a computer to evaluate the creditworthiness of the customer to determine whether to offer the customer a line of credit;

means for causing a computer to transmit to the sponsoring organization an indication whether a credit line for the customer has been approved;

means for causing a computer to create a customer account including information about the customer; and means for causing a computer to activate the customer account upon receipt from the sponsoring organization of an indication that the customer has accepted the credit line offer.

33. The medium of claim 32, further comprising means for causing a computer to receive from the sponsoring organization a guarantee of credit amount over the credit line; and means for causing a computer to indicate the guarantee in the customer account.

34. A credit line issuing system comprising:

a processor for receiving from a sponsoring organization customer information and a request for a credit line for a customer;

a first processor code module operative to execute on the processor to determine whether the customer should be offered the credit line;

a first communication port coupled to the processor operative to transmit an indication to the sponsoring organization whether the credit line has been approved for offer to the customer;

a data storage device coupled to the processor operative to store one or more databases, the databases including information regarding a customer account, information about the customer, and information about the credit line offer to the customer; and a second processor code module operative to activate the customer account upon receipt of an indicator from the sponsoring organization that the customer accepts the offer of the credit line as part of a chargeable event with the sponsoring organization.

35. The system of claim 34, wherein the customer information includes a previous transaction history of the customer.

36. The system of claim 34, wherein customer information further includes a requested line of credit.

37. The system of claim 34, further comprising a fifth processor code module operative to execute on the processor to offer the customer financial incentives to accept the credit; and a sixth processor code module operative to execute on the processor to receive an indication of acceptance of the financial incentives by the customer.

38. The system of claim 34 wherein the databases include a reservation database, a customer database, and a credit account database.

39. The system of claim 34 wherein the databases include a reservation database which includes a plurality of records each with at least one of a confirmation number element, a customer name element, a credit information element, a dates of reservation element, and an inactive card ready element.

40. The system of claim 34 wherein the databases include a customer database which includes a plurality of records each with at least one of a customer name element, an address element; a transaction history element, a card accepted element, an incentive selected element, and a incentive awarded element.

41. The system of claim 34 wherein the databases include a credit account database which includes a plurality of records each with at least one of a credit card number element, a customer name element, a customer address element, a sponsoring organization element, a total authorized credit line element, a sponsoring organization guaranteed credit line element, and an activation status element.

42. The system of claim 34, further comprising a second communication port coupled to the processor operative to transmit to the sponsoring organization an indication of an authorized line of credit for the customer.

43. The system of claim 42, further comprising a third processor code module operative to execute on the processor to receive a guarantee from the sponsoring organization of responsibility for amounts over the authorized line of credit.

44. The system of claim 43, further comprising a fourth processor code module operative to execute on the processor to increase the authorized credit line by an amount equal to the guarantee.

* * * * *